United States Patent [19]
Barquero

[11] 3,891,303
[45] June 24, 1975

[54] COMBINED SYSTEM OF OPTICAL DEVICES FOR PHOTOGRAPHY AND STEREOSCOPIC VISION

[76] Inventor: Joaquin Gomez Barquero, 2 Madrid-9, Ibiza, Spain

[22] Filed: Aug. 14, 1972

[21] Appl. No.: 280,553

[52] U.S. Cl. .................. 350/132; 350/133; 352/65
[51] Int. Cl. ......................................... G02b 27/24
[58] Field of Search ........... 350/131, 132, 137, 138, 350/133; 352/57, 65

[56] References Cited
UNITED STATES PATENTS

| | | | |
|---|---|---|---|
| 2,313,561 | 3/1943 | Mainardi et al. ................. | 352/57 X |
| 2,403,733 | 7/1946 | Mainardi et al. ................. | 352/65 X |
| 2,834,270 | 5/1958 | Williams ......................... | 350/138 X |

FOREIGN PATENTS OR APPLICATIONS

| | | | |
|---|---|---|---|
| 503,790 | 12/1954 | Italy .................................. | 350/133 |
| 118,316 | 9/1957 | U.S.S.R. ............................. | 350/138 |

Primary Examiner—Paul A. Sacher
Attorney, Agent, or Firm—Dean Sandford

[57] ABSTRACT

This invention refers to a combined system of optical devices for photography and stereoscopic vision consisting of an optical box device with two front openings, inner mirrors and prisms, adaptable to the lens of photographic cameras, cinema cameras or TV cameras, to take two optical images produced photographically or printed in books or by luminous projection on a screen, so that the image destined to be seen by the right eye is on the left side, and the image destined to be seen by the left eye is on the right side of the double image.

2 Claims, 9 Drawing Figures

PATENTED JUN 24 1975  3,891,303

SHEET 1

COMBINED SYSTEM OF OPTICAL DEVICES FOR PHOTOGRAPHY AND STEREOSCOPIC VISION

Stereoscopic vision requires each eye to turn through a small angle termed parallax, an angle which, in the brain, is associated with the sensation of distance between the object seen and the observer. The images observed by each eye are slightly different, and if photographic images are taken and reproduced from the same points that the eyes previously occupied, and if afterwards each eye is obliged to see the corresponding images, but with the essential condition that the eyes form an angle of parallax between one another on their focusing on a detail of the image, the prolonged visual rays wil converge at a point where the observer will believe that the object seen is situated.

In order to bring about this convergence there have long existed numerous optical devices, and likewise for the taking of photographs, such as cameras with double lenses or adaptors for normal cameras. In these systems the image that is to be seen by the right eye is seen on the right side of the double image, while the left image is seen on the left side: this brings it about that if the images are enlarged, for example by projecting them on a screen, they cannot produce the sensation of their being in relief, since if the horizontal separation of the two images is greater than the separation between the two eyes of the observer, the latter cannot move his eyes in such a manner that the visual rays are or become divergent; he can only move them by causing the visual rays to converge.

The system that constitutes the subject of the present patent application consists essentially in obtaining and presenting for observation the two images taken from two points which are separated by a distance approximately equal to the distance separating the two eyes, but with the images situated in a transposed manner: that is to say that the image corresponding to the right eye will be seen on the left, and the image destined to be seen by the left eye will be seen on the right. In this way, however large the images are, the two images can always be seen simultaneously, each one by the eye corresponding to it, for which purpose it is sufficient for the eyes to converge their visual rays on a point anterior to the plane of the real images, which are printed or projected on a screen.

Since the consecutive obtention of the two images serves only for motionless objects, and does not serve for still photographs, cinematography or television, the methods already known do not serve for images printed in books or projected on screens, unless the inversion that constitutes the subject of this invention is made. For this reason there are included adaptor devices for photographic cameras which distribute the normal format of the photograph into two halves, simultaneously reproducing the image corresponding to the right eye on the left half of the photograph, and, inversely, reproducing the image destined for the left eye on the right half of the photograph. These devices obey three different principles, each of which has its own distinct properties.

Direct examination of these double images makes it possible to appreciate three images: one on the left, which corresponds to the simple image that the right eye would see; another on the right, which corresponds to the simple image that the left eye would see; and, finally, a central image constituted by the two images previously mentioned which gives the sensation of being seen through a window, and of the objects being situated at different distances in depth, the observer being able to focus on any object, near or far, as he does in reality. The photographic requisite consists of the employment of a great depth of focus, with the diaphragm very closed, in order to offer the observer focused images, both near and distant.

This direct vision will be improved if the two lateral images are eliminated by means of vizors or blinkers.

In this direct vision there may be appreciated the separation of two functions of the eye that ordinarily remain united: that is to say, focus and the angle of parallax. In this case the eye has to focus the images of the screen and nevertheless form an angle that creates a visual image nearer to the eye. This is automatically achieved by the eye, although at short distances of the order of a meter it produces a certain visual fatigue. For this reason it is necessary to employ auxiliary means to see the images, which means bring it about that the visual image due to the angle of parallax of the eyes is situated in the same plane as that of the real images, and thus the two functions of the eye are again reunited.

The essence of the invention, together with its possibilities and advantages, are explained in a nonlimitative manner in the following description.

DESCRIPTION

Figure 1:
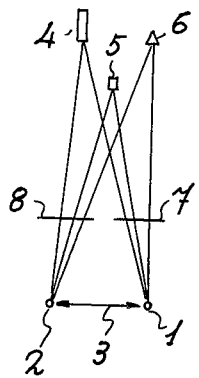
FIG. 1 shows the mechanism of real vision.

In FIG. 1 there may be appreciated the right eye (1) and the left eye (2), separated by the distance (3), viewing three objects (4), (5) and (6), or, which amounts to the same thing, a plane image at (7) seen by the right eye (1), and another image (8) seen by the left eye (2).

Figures 2, 3:
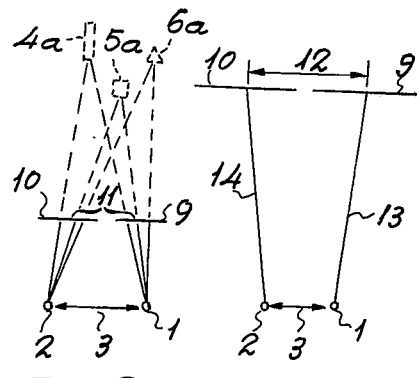
FIG. 2 shows the vision of two photographs, in accordance with the method already known.
FIG. 3 shows the impossibility of appreciating the sensation of relief with the normal procedure when the images are large.
Figure 4:
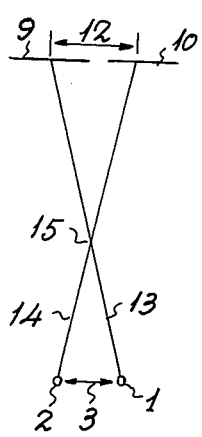
FIG. 4 shows the essence of the system, valid even when the images are large, that constitutes the subject of the present invention.

If two images (9) and (10), enlargements or reductions of images (7) and (8) of FIG. 1, are situated as shown in FIG. 2 in front of their respective eyes, the visual rays of the eyes can cut one another at the points (4a), (5a) and (6a), giving the sensation of distance as in FIG. 1, provided that the distance (11) between the two images of one and the same object is less than the distance (3) between the eyes.

When the photographic images are enlarged and present themselves as indicated in FIG. 3, with a separation (12) between the two images of one and the same object greater than (3) (in practice, up to tens of times greater) then the visual rays (13) and (14) will have to be divergent, a circumstance that cannot be attained by the eyes.

If, on the contrary, the position of the images (9) and (10) is transposed, even though the separation (12) between the two images of the same object is much greater than (3), it is always possible to look at a point (15) where the visual rays (13) and (14) cross, at which point the virtual image of the object will be situated.

Figure 5:
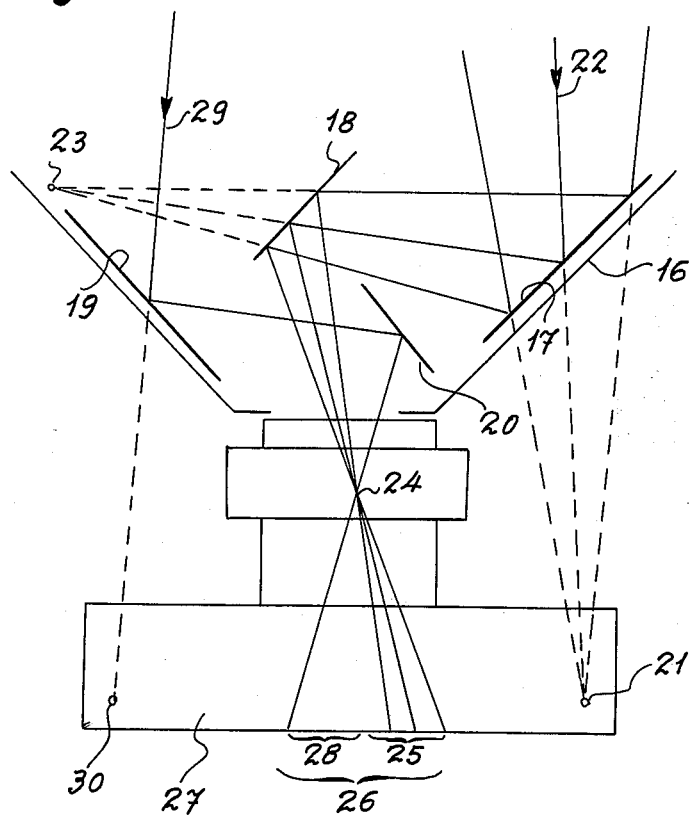
FIG. 5 illustrates the essential features of an adapter for photographic cameras, by means of the employment of a double pair of mirrors.
Figure 6:
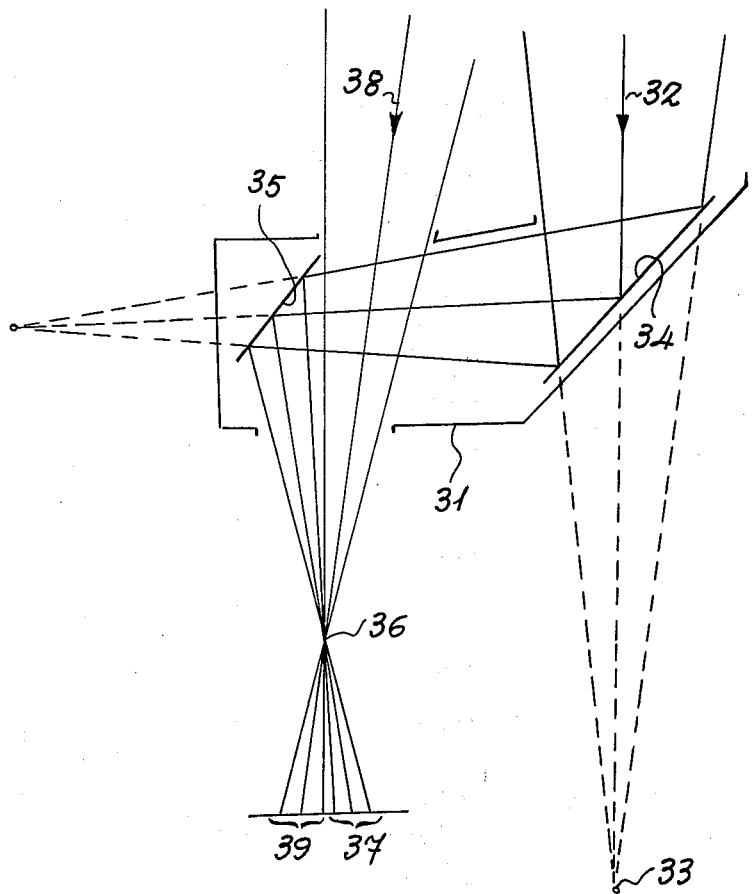
FIG. 6 shows the essential features of an adapter for photographic cameras, which has a single pair of mirrors.
Figure 7:
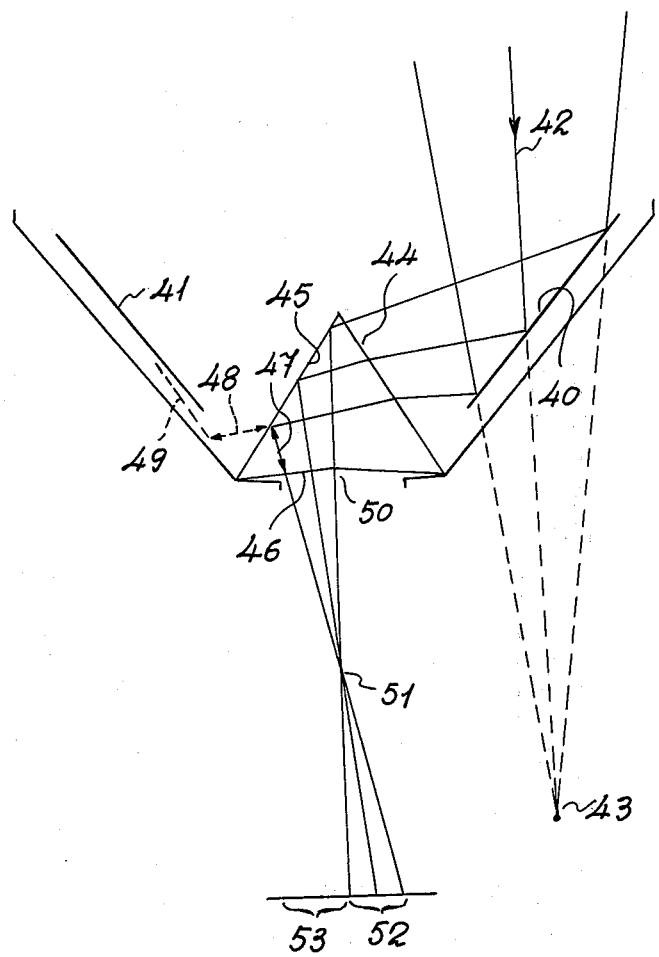
FIG. 7 shows the essential features of an adapter for photographic cameras, which employes a mixing prism.

The direct obtention of photographs, slides, and images in photographic or television cameras, with their two images transposed, is achieved with the adapters shown in FIGS. 5, 6 and 7.

Thus, in FIG. 5 we see that in a box (16) mirrors (17), (18) and (19) are situated in such a way that the visual rays of a right eye (21) correspond to the light rays (22) that reach the mirror (17) and on being reflected in it incide on the point (23), but because of the mirror (18) they are concentrated at a point (24) and subsequently form their image on the half (25) of the frame (26) of the film of the camera (27). This half, because of its being inverted, is the left half of the photograph obtained, since the right half (28) is formed by the rays (29) on their being reflected in the mirrors (19) and (20), instead of inciding on a left eye (30).

The need for employing the mirrors (18) and (20) in a staggered arrangement gives rise to the fact that the box (16) is relatively voluminous, at times larger than the camera itself; it also gives rise to the obtention of images in small angles.

FIG. 6 shows another device with a single pair of mirrors: the box (31) can be coupled to a photographic camera (not shown), the beam of light (32) being received, instead of at point (33), because of the mirrors (34) and (35), at point (36), forming the image (37), while the direct rays (38) for the image (39). This system has the disadvantage that the distance to the object from the point (36) by the direct path of the rays (38) is shorter than through the two reflections equivalent to the distance from the point (33) to the object along the rays (32). This difference, of the order of 10 centimeters, gives rise to a very small difference of size between the two images of the same object situated 3 meters away: it is inappreciable at greater distances. Both in one and the other case, the sensation of the photographs produced being in relief is excellent. It has the advantage, on the light beams (38) being direct, of permitting a better focus, and of enabling the volume of the box (31) to be only 40 percent, approximately, of the device shown in FIG. 5.

A considerably more expensive device, but one of the highest possible quality, is that shown in FIG. 7, in which the pair of central mirrors (18) and (20) of FIG. 5 has been substituted by a prism which, by means of refraction and reflection, effects the transposition of images in a very limited space; moreover, it is completely symmetrical. In FIG. 7 we see that the box (39) has a pair of symmetrical mirrors (40) and (41). The rays (42) that would form the image of the right eye if the latter were at (43) are reflected in the mirror (40) and then incide on the face (44) of the prism, where they are refracted, and all of them reach the inner face (45) of the prism, where they undergo a total reflection due to their inclination, and travel to the left half (46) of the third face, the trajectory (47) of the light within the prism being equivalent, after it has been reflected, to the trajectory (48) which the beams would traverse if the prism continued as far as the imaginary face (49) which, in order that it may be parallel to the face (44) and thus avoid distortions of the image, requires that the angles of the edges of the prism have the same value, and thus the front face (50) will be dihedral, except in the special case when the same angles are 60°. For this reason, and because of symmetry, if the rays (42) are concentrated at the point (51), and subsequently in the photographic camera, they form the image (52). The light rays that reach the mirror (41) will come to form the image (53), crossing in the interior of the prism without interfering with one another so that the two anterior faces of the prism refract the light that enters the prism and reflect the light that reaches them from the interior of the prism.

Figure 8:
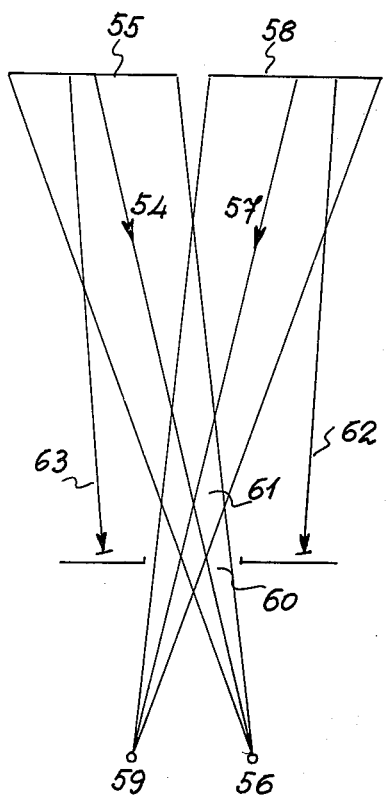
FIG. 8 shows the employment of a simple vizor or blinkers.

FIG. 8 shows a simple vizor or blinkers consisting of an opening in an opaque plate: the light rays (54), which proceed from the image (55) that the right eye (56) should see, reach the eye; likewise, the light rays (57) of the image (58) that the left eye (59) should see traverse the aperture (60) of the opaque plate (60a), relief being seen in the whole of the hatched zone (61); in this case the angles of parallax of the eyes correspond to the fixing of the gaze on objects situated in the hatched zone (61) at a distance different from that of the real images (55), (58) on which the gaze should be focused.

The rays (62) of the image (58) of the left eye cannot reach the right eye (56) because of the opaque screen (60a) impeding them, and the same occurs, because of symmetry, with the rays (63) that do not reach the eye (59).

Figure 9:
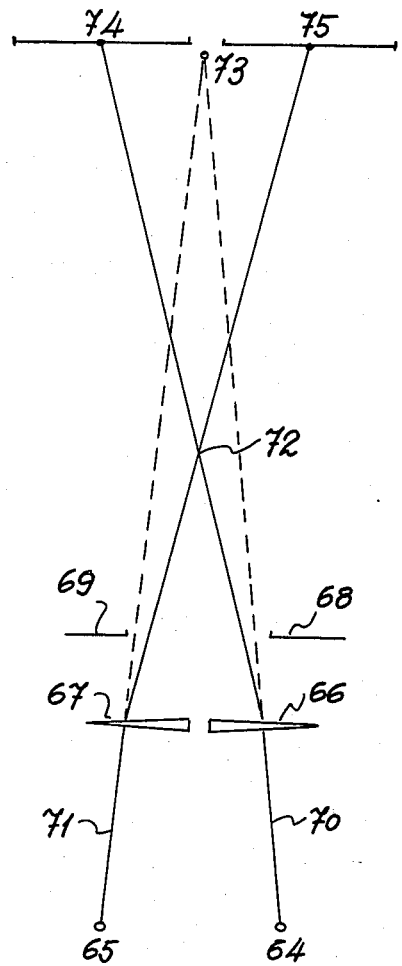
FIG. 9 shows the employment of an improved form of vizor or blinkers.

Vision is made more comfortably by means of the employment of one or two prisms, as indicated in FIG. 9. In this case, there are situated in front of the eyes (64) and (65) the prisms (66) and (67) and two vizors or opaque screens (68) and (69) so that the visual rays (70) and (71), although they really cross at the point (72), give the impression of crossing at the virtual point (73), which will give the distance, and since this is the distance, approximately, of the real images (74) and (75) the natural focus, as it does in reality, coincides with the angle of parallax. Since in the simplified vizor the opaque screens (68) and (69) prevent the right eye (64) from seeing the image (75) destined for the left eye (65), and inversely this eye (65) cannot see the image (74).

The physical construction of this device can take the form of a dihedral magnifying glass, or of spectacles with prisms in front of each eye, fitted with opaque vizors to eliminate the lateral images.

What is claimed is:

1. An attachment for use with photographic, television and cinema cameras that simultaneously produces in a unit frame a pair of transposed stereographic images from light reflected by an object, which images can be photographed, televised, or cinematographed with conventional equipment, said attachment comprising:
   a housing adapted for mounting at the front of the camera, said housing having two horizontally spaced front apertures for the receipt of the pair of light images and a rear aperture for transmitting said images into the object lens of the camera;

first mirror means mounted at an angle within said housing at the right of the front aperture for reflecting the light image received through the right aperture of said pair of front apertures toward the interior of the housing at substantially a right angle to the entering image; and second mirror means mounted at the left side of said housing at an angle with respect to said first mirror means for reflecting light inciding from said first mirror means to the left half of said rear aperture, the light image entering at the left aperture of said pair of front apertures crossing the light image reflected from said first mirror means within said housing and passing directly through the right half of the rear aperture without deviation, rotation or inversion of the light image whereby the right image is displayed at the right side of the film plane of the camera and the left image is displayed at the left side of the film plane.

2. An attachment for use with photographic, television and cinema cameras that simultaneously produces in a unit frame a pair of transposed stereographic images from light reflected by an object, which images can be photographed, televised, or cinematographed with conventional equipment, said attachment comprising:

a housing adapted for mounting at the front of the camera, said housing having two horizontally spaced front apertures for the receipt of the pair of light images and a rear aperture for transmitting said images into the object lens of the camera;

first mirror means mounted at an angle within said housing to the rear of one of said front apertures for reflecting the light image received through said aperture toward the interior of the housing at substantially a right angle to the entering image; and second mirror means mounted at the opposite side of said housing as said first mirror means and at an angle with respect to said first mirror means for reflecting light inciding from said first mirror means to the adjacent half of said rear aperture, the light image entering at the other aperture of said pair of front apertures crossing the light image reflected from said first mirror means within said housing and passing directly through the other half of the rear aperture without deviation, rotation or inversion of the light image whereby the right image is displayed at the right side of the film plane of the camera and left image is displayed at the left side of the film plane.

* * * * *